(12) United States Patent
Palanisamy

(10) Patent No.: US 10,255,915 B2
(45) Date of Patent: Apr. 9, 2019

(54) VOICE BASED DIAGNOSTIC SYSTEMS AND METHODS

(71) Applicant: Ademco Inc., Golden Valley, MN (US)

(72) Inventor: Prabhu Palanisamy, Bangalore (IN)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 15/434,337

(22) Filed: Feb. 16, 2017

(65) Prior Publication Data

US 2017/0162199 A1 Jun. 8, 2017

Related U.S. Application Data

(63) Continuation of application No. 14/101,097, filed on Dec. 9, 2013, now Pat. No. 9,607,608.

(51) Int. Cl.

| *G10L 21/00* | (2013.01) |
|---|---|
| *G10L 25/00* | (2013.01) |
| *G10L 15/22* | (2006.01) |
| *G10L 13/00* | (2006.01) |
| *G06F 11/00* | (2006.01) |
| *G10L 15/00* | (2013.01) |
| *H04L 12/28* | (2006.01) |
| *G10L 15/18* | (2013.01) |
| *G06F 11/07* | (2006.01) |
| *G06F 11/22* | (2006.01) |

(52) U.S. Cl.
CPC ............. *G10L 15/22* (2013.01); *G06F 11/00* (2013.01); *G06F 11/079* (2013.01); *G06F 11/0736* (2013.01); *G06F 11/22* (2013.01); *G10L 13/00* (2013.01); *G10L 15/00* (2013.01); *G10L 15/18* (2013.01); *H04L 12/282* (2013.01); *G10L 2015/223* (2013.01)

(58) Field of Classification Search
CPC .... G06F 21/552; G06F 19/3406; G06F 3/167; G06F 1/3206; G06F 19/00; G06F 3/04895; G06F 11/263; G10L 15/30; G10L 13/00; G10L 15/26; G10L 13/02; G10L 15/00; G10L 25/48; G10L 15/18; G10L 17/22; H04L 51/38; H04L 12/2697; H04L 41/5038; H04L 43/50
See application file for complete search history.

(56) References Cited

U.S. PATENT DOCUMENTS

| 6,262,669 | B1 | 7/2001 | Leu |
|---|---|---|---|
| 6,633,801 | B1 | 10/2003 | Durlacher et al. |
| 6,940,820 | B2 | 9/2005 | Fang |
| 7,752,501 | B2 * | 7/2010 | Bak ......................... G06F 9/451 |
| | | | 714/38.14 |
| 8,175,884 | B1 | 5/2012 | Morris |
| 8,224,649 | B2 * | 7/2012 | Chaudhari .............. G10L 17/00 |
| | | | 704/246 |
| 8,666,748 | B2 | 3/2014 | Dong et al. |
| 9,132,913 | B1 | 9/2015 | Shapiro et al. |
| 2001/0030611 | A1 | 10/2001 | O'Rourke |

(Continued)

*Primary Examiner* — Michael Ortiz-Sanchez
(74) *Attorney, Agent, or Firm* — Shumaker & Sieffert, P.A.

(57) ABSTRACT

A method for voice based diagnostics can include receiving a voice command from a user at a computing device, performing, by the computing device, a number of diagnostic tests corresponding to a functionality of the computing device, and sending an audio message to the user, wherein the audio message corresponds to results of the number of diagnostic tests.

17 Claims, 3 Drawing Sheets

(56) References Cited

U.S. PATENT DOCUMENTS

| | | |
|---|---|---|
| 2002/0087319 A1 | 7/2002 | Stephenson |
| 2002/0133571 A1 | 9/2002 | Jacob et al. |
| 2002/0181405 A1 | 12/2002 | Ying |
| 2003/0025682 A1* | 2/2003 | Dame ................ G08G 5/0021 345/184 |
| 2003/0233129 A1 | 12/2003 | Matos |
| 2004/0124998 A1* | 7/2004 | Dame ................ G08G 5/0013 340/945 |
| 2005/0228674 A1* | 10/2005 | Gunn ................ G06F 3/04895 704/270 |
| 2006/0259392 A1 | 11/2006 | Rabenold et al. |
| 2007/0288129 A1 | 12/2007 | Komer et al. |
| 2008/0034060 A1 | 2/2008 | Fisher, Jr. |
| 2009/0037496 A1* | 2/2009 | Chong ................ G06F 11/0709 |
| 2009/0041215 A1 | 2/2009 | Schmitt et al. |
| 2010/0030400 A1 | 2/2010 | Komer et al. |
| 2010/0076644 A1* | 3/2010 | Cahill ................ G07C 5/0808 701/31.4 |
| 2010/0082118 A1 | 4/2010 | McGreevy et al. |
| 2010/0256864 A1 | 10/2010 | Ying |
| 2011/0257839 A1 | 10/2011 | Mukherjee |
| 2015/0317243 A1* | 11/2015 | Green ................ G06Q 20/127 714/38.1 |

* cited by examiner

VOICE BASED DIAGNOSTIC SYSTEMS AND METHODS

PRIORITY INFORMATION

This application is a continuation of U.S. application Ser. No. 14/101,097, filed Dec. 9, 2013, the entire specification of which is incorporated herein by reference.

TECHNICAL FIELD

The present disclosure relates to voice based diagnostic systems and methods.

BACKGROUND

Electrical and electronics devices, such as computing devices, can have a plurality of functionality. That is, a single computing device can be capable of performing a plurality of tasks with a plurality of software, hardware, and/or logic to perform the plurality of tasks. With the computing devices having a plurality of functionality, it can be difficult to perform diagnostic testing, retrieving information, and/or accessing data on each of the plurality of software, hardware and/or logic that performs the plurality of functionality.

DETAILED DESCRIPTION

Figure 1:
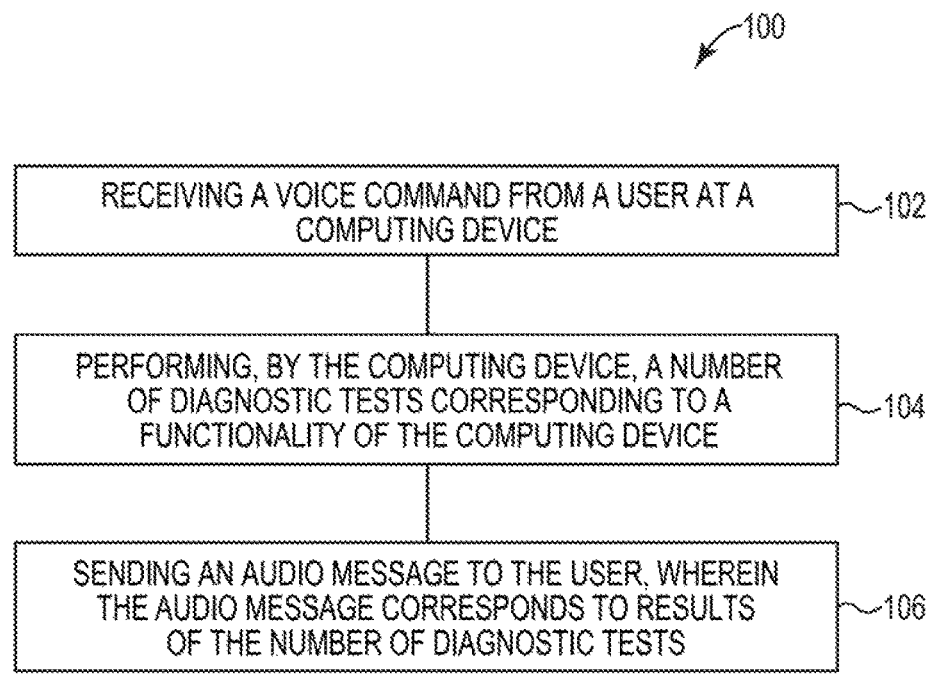
FIG. 1 illustrates an example of a method for voice based diagnostics in accordance with one or more embodiments of the present disclosure.

A method for voice based diagnostics and/or information access can include receiving a voice command from a user at a computing device, performing, by the computing device, a number of diagnostic tests corresponding to a functionality of the computing device, and sending an audio message to the user, wherein the audio message corresponds to results of the number of diagnostic tests. In addition, in certain embodiments the method can include receiving diagnostic results and/or data reports via text to speech (TTS) on a mobile electronic device and/or diagnostic results via email at an account of a user as a text form (e.g., word document, etc.).

Voice based diagnostics can include a computing device that includes a sound recognition device (e.g., microphone, voice recognition device, speech recognition device, natural language understanding (NLU), etc.) to receive a number of voice commands. The number of voice commands can include diagnostic instructions for the computing device. The diagnostic instructions can be specific instructions to determine if a particular functionality of the computing device is operating to a particular specification (e.g., manufacturer specification, etc.).

A user can give a vocal diagnostic instruction (e.g., voice command, etc.) to the computing device that can be a general instruction to determine if a plurality and/or all of the functionality of the computing device is operating to the particular specification. The vocal diagnostic instruction can include a trigger word (e.g., word or phrase to activate the computing device, etc.) and a command (e.g., description of diagnostic tests to be performed, etc.). For example, the user can use the trigger word "HI HONEY" to activate the computing device. In an additional example, the user can use other trigger words such as "HELLO DEVICE", where the user utilizes a device name, a model name and/or a common name for the device. Once the computing device is activated (e.g., triggered), the user can use the command "ARE YOU WORKING". In this example, the combination of the trigger word and the command (e.g., combining the trigger and command in a phrase) can instruct the computing device to perform a number of diagnostic tests on the hardware, software, and/or logic of the computing device to determine if the functionality of the computing device is operating to the particular specification. In addition, information relating to the results of the diagnostic tests can be shared with the user via an electronic message (e.g., text message to a mobile device such as a cell phone, email to an account of the user, etc.).

The computing device can create a diagnostic report after completing the number of diagnostic tests and respond with an audio message and/or electronic message (e.g., text message (SMS), email, voicemail, etc.), utilizing a speaker or other device, to notify the user that the number of diagnostic tests are completed and/or to describe the diagnostic report to the user. For example, the computing device can respond with the audio message "DONE. EVERYTHING IS OK" to notify the user that the number of diagnostic tests are complete and that all hardware and/or software within the computing device is operating to the particular specification. In addition, the computing device can respond to the user by presenting (e.g., audio message questions, text message questions, emailed questions, etc.) a number of questions to the user. The questions can include questions relating to further testing (e.g., additional tests, repeating the same tests, etc.). The questions can also include requests by the computing device for additional information.

Voice based diagnostics can enable a user to check if a computing device and/or system that includes the computing device is operating properly (e.g., particular specification, manufacturer specification, value (number), connection details, connectivity information, data information, etc.) without having to initiate a plurality of diagnostic software and/or without having to perform a physical inspection of the hardware. This can allow a remote user (e.g., user not in the same location as the computing device, computing device is out of physical reach of the user, etc.) to perform diagnostic testing of the computing device and/or system that includes the computing device.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of diagnostic tests" can refer to one or more diagnostic tests.

FIG. 1 illustrates an example of a method 100 for voice based diagnostics in accordance with one or more embodiments of the present disclosure. Voice based diagnostics can be utilized by a user to determine if there are any technical issues (e.g., malfunctioning software, not working, suspicious, random values, false results, test, opening box to rectify, hardware, and/or logic, etc.) with a computing device and/or a system that includes the computing device. The technical issues can include problems with the software and/or hardware of the computing device or problems with other devices within the system and/or a different connected system. The problems can cause a functionality of the computing device or a functionality of other devices to malfunction (e.g., operate differently than a particular specification, operate differently than a manufacturer specification, etc.).

At 102, the method 100 can include receiving a voice command from a user at a computing device. The voice command can be received from the user at a microphone or other sound recognition device coupled (e.g., communicatively coupled, etc.) to the computing device. The voice command can include a fixed voice command (e.g., a grammar defined voice command) and/or a natural speech voice command (e.g., a natural language voice command), among other voice commands.

The user can utilize a trigger word to activate (e.g., turn on, notify that a command is subsequently being provided, etc.) the computing device. The user can utilize a command to describe the diagnostics that user wants the computing device to perform.

The trigger word can be a word or phrase that prepares the computing device for the command. For example, the trigger word can be "HELLO DEVICE". In this example, "DEVICE" can be replaced by a device name, a generic application name, a model name, and/or a user defined name. Additionally in this example, when the computing device receives the trigger word it is ready to receive the command from the user. The trigger word can be utilized to prevent the user from accidentally activating the computing device and/or accidentally initiating a number of functions of the computing device. For example, if the command is "WHAT'S WRONG" the user might be asking the question to a person within the same area and not attempting to send a command to the computing device.

The command can be predetermined words and/or phrases that initiate a particular number of diagnostic tests. For example, the command can be "WHAT'S WRONG" and the corresponding number of diagnostic tests can include diagnostics tests for all software, hardware, and/or logic within the computing device and/or for software, hardware, and/or logic for devices within a system.

The command can also be directed to a particular function of the computing device. For example, the computing device can be a thermostat that controls a number of temperature settings for a building. In this example, the user can use the command "IS EVERYTHING ALRIGHT WITH THE COOLING SETTING". The command in this example can initiate the computing device to specifically use diagnostic tests that focus on the software, hardware, and/or logic associated with the cooling settings of the thermostat.

In addition, the command can be directed to device information (e.g. serial number, specifications, etc.) for the computing device and/or device information for other devices within a system. For example, the voice command can be "WHAT ARE YOU". In this example, the voice command is a request by the user for the device information corresponding to the computing device. The device information can be stored on the computing device and/or other devices within the system. The device information can be utilized by the user to determine a model of the computing device and/or what type of functionality the computing device is capable of performing when operating at the particular specifications. Since the device information can be stored within the computing device and/or within a device in the system, the computing device can send a voice message to the user describing the device information and/or send device information descriptions (e.g., manuals that correspond to the computing device, manuals that correspond to the other devices within the system, etc.) to a different computing device of the user. In some embodiments, the test results and/or corresponding data can be difficult to describe to a user via a voice message. In these embodiments, the test results and/or corresponding data can be sent via a text message to a mobile device and/or an email to an account associated with the user.

Receiving the voice command from the user can include receiving the voice command from a remote user. The remote user can be a user that is not in an area that is accessible or easily accessible to the computing device. For example, the computing device can be an alarm system that is located on a ceiling of a building. In this example, the user may not be able to physically access the alarm system without a ladder or other device. The user in this example would still be able to perform the diagnostic tests on the alarm system without having to access the ladder or other device. In other examples, the user may not be in the building where the computing device is physically located. For example, the user can utilize a communications device (e.g., cell phone, etc.) to communicate with the computing device from a location other than the building where the computing device is physically located. In this example, the user can communicate with the computing device and perform the number of diagnostic tests without having to be in the building where the computing device is physically located.

At 104, the method 100 can include performing, by the computing device, a number of diagnostic tests corresponding to a functionality of the computing device. As described herein, the computing device can be capable of performing a number of functions. For example, the computing device can be a device such as a thermostat to control an interior temperature of a building. In this example, the functions can include: determining a temperature, displaying the determined temperature, displaying an exterior temperature of the building, communication capabilities (e.g., intercom, telephone capabilities, etc.), security capabilities (e.g., detect unwanted intruders, notify authorities, etc.), among other functions. Each of the functions of the computing device can utilize software, hardware, logic, or a combination of software, hardware and/or logic.

It can be difficult for a user to diagnose a problem with a function of the computing device with each of the functions utilizing various software, hardware and/or logic. In addition, the computing device can utilize software, hardware, and/or logic from a number of other devices within a system. This can add to the difficulty for the user to diagnose the problem with a function of the computing device. For example, if the computing device is a thermostat as described herein, displaying an exterior temperature can be a function of the thermostat. In this example, the thermostat can utilize software within the thermostat to retrieve the exterior temperature from a temperature device (e.g., thermometer, electronic thermometer, etc.) located at an exterior position of the building. In addition, the thermostat can utilize a graphical user interface (GUI) to display the exterior temperature to the user. In this example, a problem with displaying the exterior temperature can be due to software within the thermostat, hardware and/or software of the temperature device located an exterior position of the building, and/or the GUI.

Due to difficulties diagnosing problems with a functionality of a computing device, the user can utilize commands to ask the computing device to diagnose a particular problem and/or to diagnose the entire system. For example, if there is a problem with a thermostat displaying the exterior temperature, the user can use the command "IS EVERYTHING ALRIGHT WITH THE EXTERIOR TEMPERATURE". The thermostat can receive the command and perform a number of diagnostic tests that correspond to software and/or hardware utilized to display the exterior temperature. For example, the thermostat can perform a diagnostic test on the software utilized to retrieve the exterior temperature from the exterior temperature device, perform a diagnostic test on the hardware of the temperature device, and perform a diagnostic test on the GUI. As described herein, the thermostat can generate a diagnostics report and provide the user with the diagnostics report either by sending a voice message to the user describing the diagnostics report and/or by displaying the diagnostics report.

In addition, it can be difficult to determine a problem with the functionality of the computing device. For example, prior to delivering a computing device to a user, the manufacturer may want to determine if the device is operational to the manufacturer specifications. A tester (e.g., manufacturer tester, product tester, user, etc.) can perform a number of diagnostic tests on the computing device. The tester can utilize the voice based diagnostics to initiate the computing device to perform a diagnostic test of all the software, hardware, and/or logic of the computing device. For example, the tester can use the command "WHAT'S WRONG" to have the computing device perform a number of diagnostic tests corresponding to all software, hardware, and/or logic that is utilized by the computing device. This can ensure that the software and/or hardware of the computing device is functioning to the specifications of the manufacturer prior to sending the computing device to a user and/or retailer for sale.

Performing the number of diagnostic tests can include a number of functionality tests. For example, performing the number of diagnostic tests can include determining a connection of the hardware within the computing device. The connection of the hardware can include a physical connection between hardware within the computing device. For example, the computing device can include a processor coupled to a memory device. In this example, the number of diagnostic tests can include determining if the processor is properly coupled to the memory device to enable the computing device to perform functions.

At 106, the method 100 can include sending an audio message to the user, wherein the audio message corresponds to results of the number of diagnostic tests. The audio message can be sent to the user via a speaker coupled to the computing device. That is, the computing device can give a vocal message to the user describing the results of the number of diagnostic tests. The audio message can include, but is not limited to, a prerecorded audio message and/or a text to speech audio message.

The audio message can include details of software and/or hardware within the computing device and/or a system that includes the computing device. For example, the audio message can include a description of a particular function that is not operating to a particular specification and/or particular software and/or hardware that is causing the particular function to operate to the particular specification.

The audio message can include a message to confirm that the software and/or hardware are operating to the particular specification. For example, the audio message can include "EVERYTHING IS OK" to inform the user that the hardware and/or software is operating to the particular specification. The audio message can also be sent to a mobile device (e.g., cell phone, etc.) via a communication link between the computing device and the mobile device (e.g., portable electronic device, cell phone, tablet, etc.).

Figure 2:
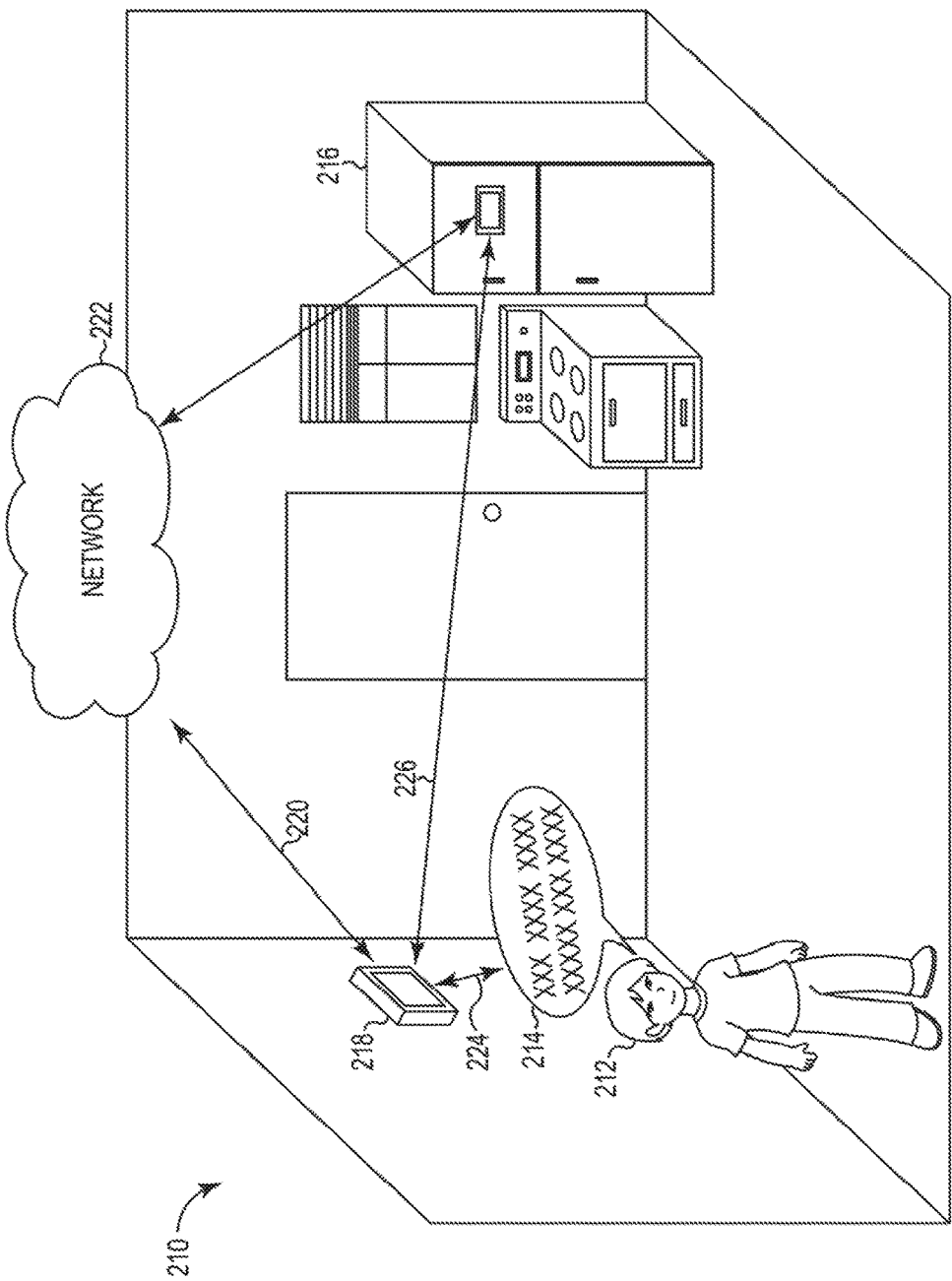
FIG. 2 illustrates an example of a voice based diagnostic system in accordance with one or more embodiments of the present disclosure.

FIG. 2 illustrates an example of a voice based diagnostic system 210 in accordance with one or more embodiments of the present disclosure. The voice based diagnostic system 210 can include a computing device 218 (e.g., thermostat, security system, computing hub (hub), etc.). The computing device 218 can be a hub that includes being communicatively coupled to a network 222 (e.g., local area network (LAN), wide area network (WAN), internet, etc.) and/or communicatively coupled to a number of other devices (e.g., security system, refrigerator 216, other computing devices, consumer electronics devices, industrial devices, automated systems, robots, etc.).

As described herein, a user 212 can give a voice command 214 to the computing device 218. The voice command 214 can include a trigger word to activate the computing device 218 and/or notify the computing device 218 that the user 212 is prepared to provide a command. In some embodiments, the user 212 can utilize a trigger word and a plurality of commands. For example, the user 212 can give a voice command 214 that includes a trigger word and two commands (e.g., "WHAT ARE YOU" and "IS EVERYTHING ALRIGHT") for the computing device 218 to perform.

The voice command 214 can include a command (e.g., vocal instructions, vocal question, etc.) to perform a number of diagnostic tests as described herein. The voice command 214 can include instructions to perform a number of diagnostic tests on the computing device 218 and/or on other devices communicatively coupled to the computing device 218. For example, the user 212 can provide a voice command 214 to the computing device 218 that includes "IS EVERYTHING ALRIGHT". In this example, the computing device 218 can perform a number of diagnostic tests on the software and/or hardware of the computing device 218. In addition, the computing device 218 can perform a number of diagnostic tests on the software and/or hardware of the refrigerator 216 (e.g., refrigerator that includes a computing device that includes communication capabilities, etc.).

As described herein, the user 212 can be at a remote location from the computing device 218. For example, a distance 224 between the computing device 218 and the user 212 can be a distance that makes the computing device 218 inaccessible to the user 212. In this example, the computing device 218 can be located on a ceiling of the building and not easily accessible by the user 212.

The computing device 218 can utilize a communication path 220 and utilize the network 222 to communicate with the refrigerator 216. Through the communication path via network 222, the computing device 218 can perform a number of diagnostic tests on the software and/or hardware of the refrigerator 216. In addition, the computing device 218 can utilize communication path 226 to communicate directly with the refrigerator 216. For example, other devices that are communicatively coupled to the computing device 218 can utilize other communication paths (e.g., Bluetooth, near field communication (NFC), etc.) to communicate directly with the computing device 218.

The computing device 218 can generate a diagnostic report based on the number of diagnostic tests performed. The diagnostic report can include a number of technical issues (e.g., software issues, hardware issues, functional issues, etc.) for the computing device 218 and/or for the number of other devices communicatively coupled to the computing device 218. The diagnostic report can be exported (e.g., sent to a computing device, sent to a smart phone or tablet, presented in a spreadsheet, etc.) to give a more detailed report of the diagnostic results from the diagnostic tests. For example, the diagnostic report can include a detailed description of devices tested and can be generated using a spreadsheet and stored in memory (e.g., memory of the computing device, database, etc.). In another example, the diagnostic report can include the type of diagnostic tests that were performed on each of the number of devices.

The diagnostic report can include descriptions of software and/or hardware that are not performing to a particular specification (e.g., manufacturer specification, etc.). For example, the diagnostic report can include a number functions that are not performing to a manufacturer specification. The diagnostic report can also include a description of hardware elements that are not performing to a manufacturer specification. For example, the diagnostic report can include a description of hardware elements that are not connected to the manufacturer specification.

The diagnostic report can also include a description of possible solutions to each of the determined number of diagnostic issues. For example, the diagnostic report can include a description that the computing device 218 is not in communication with the refrigerator 216. In this example, the diagnostic report can include a number of possible solutions to fix the communication problem between the computing device 218 and the refrigerator 216. In addition, the diagnostic report can include a description of the number of devices that are not operating with the computing device 218 to a manufacturer specification. For example, the refrigerator 216 can be configured to operate with the computing device 218 for a number of functions. If one or more of the number of functions are not operating to the manufacturer specification a description of the refrigerator 216 and the one or more functions that are not operating to the manufacturer specification can be included within the diagnostic report.

The generated diagnostic report can be utilized by the computing device 218 when sending an audio message to the user 212. For example, the audio message sent to the user 212 can include a description of the generated diagnostic report. The audio message can include a description of the software and/or hardware that is having diagnostic issues. For example, the audio message can include a description of software modules that are not operating at the manufacturer specification. In this example, the audio message can also include a possible solution to fixing the software modules that are not operating at the manufacturer specification. In this example, the solution can include performing a restart and/or download an update that is available.

Figure 3:
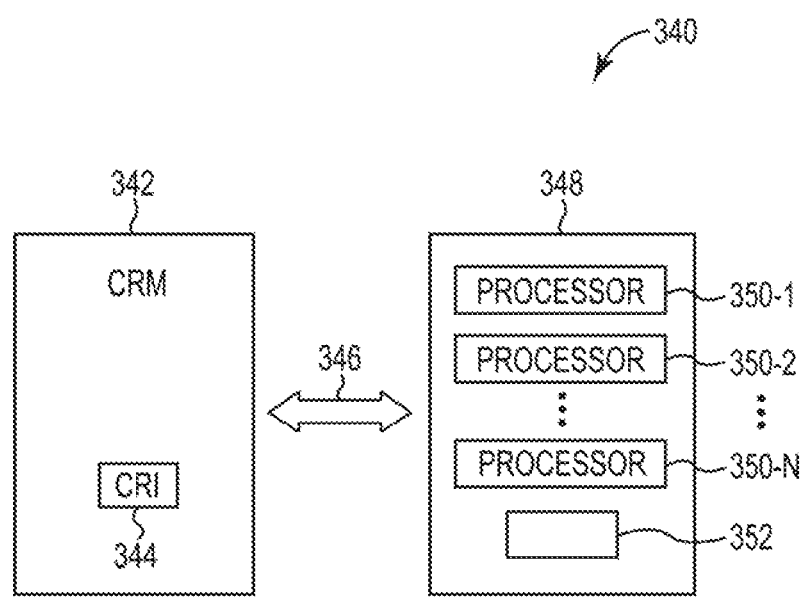
FIG. 3 illustrates a block diagram of an example of a computing device in accordance with one or more embodiments of the present disclosure.

FIG. 3 illustrates a block diagram of an example of a computing device 340 in accordance with one or more embodiments of the present disclosure. The computing device 340 can include a communication interface (e.g., wireless network interface controller, IEEE 802.11 adapters, etc.) for receiving wireless data. The communication interface can be integrated in the computing device 340 and/or be an external card.

The computing device 340, as described herein, can also include a computer readable medium (CRM) 342 in communication with processing resources 350-1, 350-2, ..., 350-N. CRM 342 can be in communication with a device 348 (e.g., a Java® application server, among others) having processor resources 350-1, 350-2, ..., 350-N. The device 348 can be in communication with a tangible non-transitory CRM 342 storing a set of computer-readable instructions (CRI) 344 (e.g., modules) executable by one or more of the processor resources 350-1, 350-2, ..., 350-N, as described herein. The CRI 344 can also be stored in remote memory managed by a server and represent an installation package that can be downloaded, installed, and executed. The device 348 can include memory resources 352, and the processor resources 350-1, 350-2, ..., 350-N can be coupled to the memory resources 352.

Processor resources 350-1, 350-2, ..., 350-N can execute CRI 344 that can be stored on an internal or external non-transitory CRM 342. The processor resources 350-1, 350-2, ..., 350-N can execute CRI 344 to perform various functions. For example, the processor resources 350-1, 350-2, ..., 350-N can execute CRI 344 to perform a number of functions (e.g., generate a diagnostic report based on the determined number of diagnostic issues, etc.). A non-transitory CRM (e.g., CRM 342), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 342 can also include distributed storage media. For example, the CRM 342 can be distributed among various locations.

The non-transitory CRM 342 can be integral, or communicatively coupled, to a computing device, in a wired and/or a wireless manner. For example, the non-transitory CRM 342 can be an internal memory, a portable memory, a portable disk, or a memory associated with another computing resource (e.g., enabling CRIs to be transferred and/or executed across a network such as the Internet).

The CRM 342 can be in communication with the processor resources 350-1, 350-2, ..., 350-N via a communication path 346. The communication path 346 can be local or remote to a machine (e.g., a computer) associated with the processor resources 350-1, 350-2, ..., 350-N. Examples of a local communication path 346 can include an electrical bus internal to a machine (e.g., a computer) where the CRM 342 is one of volatile, non-volatile, fixed, and/or removable storage medium in communication with the processor resources 350-1, 350-2, ..., 350-N via the electrical bus. Examples of such electrical buses can include Industry Standard Architecture (ISA), Peripheral Component Interconnect (PCI), Advanced Technology Attachment (ATA), Small Computer System Interface (SCSI), Universal Serial Bus (USB), among other types of electrical buses and variants thereof.

The communication path 346 can be such that the CRM 342 is remote from the processor resources e.g., 350-1, 350-2, ..., 350-N, such as in a network relationship between the CRM 342 and the processor resources (e.g., 350-1, 350-2, . . . , 350-N). That is, the communication path 346 can be a network relationship. Examples of such a network relationship can include a local area network (LAN), wide area network (WAN), personal area network (PAN), and the Internet, among others. In such examples, the CRM 342 can be associated with a first computing device and the processor resources 350-1, 350-2, . . . , 350-N can be associated with a second computing device (e.g., a Java® server).

As described herein, a "module" can include computer readable instructions (e.g., CRI 344) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for voice based diagnostics, comprising:
   receiving, by a computing device, a voice command describing a number of diagnostic tests to be performed on the computing device, wherein the voice command is from a user who does not have physical access to the computing device;
   performing, by the computing device, the number of diagnostic tests on a functionality of hardware of the computing device responsive to the received voice command;
   sending an audio message that includes a description of a fix of the functionality of the hardware of the computing device determined by results of the number of diagnostic tests relative to a particular specification; and
   performing the fix on the functionality of the hardware.

2. The method of claim 1, wherein performing the number of diagnostic tests includes determining a status of physical connection between the hardware within the computing device.

3. The method of claim 1, wherein the audio message includes a description of the results of the number of diagnostic tests.

4. The method of claim 1, wherein the audio message is sent by a prerecorded audio message.

5. The method of claim 1, wherein the audio message is sent by a text to speech message.

6. A non-transitory computer readable medium, comprising instructions to:
   perform a number of diagnostic tests on software of another device responsive to receipt of a voice command;
   send, to a source of the voice command, a request for information related to performance of additional diagnostic tests on the software of the other device;
   generate a diagnostic report based on results of performing the number of diagnostic tests and the additional diagnostic tests on the software of the other device;
   send an audio message based on the diagnostic report that includes a description of a fix of a functionality of the software of the other device determined as a diagnostic issue by results of the number of diagnostic tests and the additional diagnostic tests relative to a particular specification; and
   perform the fix on the functionality of the software.

7. The medium of claim 6, further comprising instructions to receive the voice command at a computing device, the voice command describing the number of diagnostic tests to be performed on the software of the other device.

8. The medium of claim 6, wherein the voice command is a grammar defined voice command.

9. The medium of claim 6, wherein the voice command is a natural language voice command.

10. The medium of claim 6, further comprising instructions to send the voice command from the computing device via an electronic communication to a processing resource remote from the computing device.

11. The medium of claim 6, further comprising instructions to perform the number of diagnostic tests via an electronic communication from a processing resource that is remote to the other device.

12. The medium of claim 6, wherein the software is located on computing devices connected to a particular network.

13. A system, comprising:
   a computing device including instructions to:
      determine a number of software devices and a number of hardware devices that correspond to a voice command including a number of diagnostic tests to be performed on the software devices and hardware devices;
      perform a software diagnostic test on the number of software devices of the computing device;
      perform a hardware diagnostic test on the number of hardware devices of the computing device;
      send an audio message to a user who does not have physical access to the computing device, wherein the audio message includes a description of a fix of a diagnostic issue in a functionality of either the software or hardware devices of the computing device as determined by results of the diagnostic tests relative to a particular specification; and perform the fix on the functionality of either the software or hardware devices.

14. The system of claim 13, further including instructions to determine a number of diagnostic issues based on the software diagnostic test and the hardware diagnostic test performed on the number of software and hardware devices.

15. The system of claim 13, wherein the audio message is generated based upon a diagnostic report to include a number of functions that are not performing to a manufacturer specification.

16. The system of claim 13, wherein the audio message is generated based upon a diagnostic report to include a description of the hardware devices that are not performing to a manufacturer specification.

17. The system of claim 13, wherein the audio message is generated based upon a diagnostic report to include a description of the number of the software devices that are not operating with the computing device to a manufacturer specification.

* * * * *